US010084773B2

(12) United States Patent
Burch et al.

(10) Patent No.: US 10,084,773 B2
(45) Date of Patent: Sep. 25, 2018

(54) TIME-BASED ONE TIME PASSWORD (TOTP) FOR NETWORK AUTHENTICATION

(71) Applicant: NetIQ Corporation, Provo, UT (US)

(72) Inventors: Lloyd Leon Burch, Payson, UT (US); Duane Fredrick Buss, West Mountain, UT (US); Larry Hal Henderson, Orem, UT (US)

(73) Assignee: NetIQ Corporation, Provo, UT (US)

( * ) Notice: Subject to any disclaimer, the term of this patent is extended or adjusted under 35 U.S.C. 154(b) by 0 days.

(21) Appl. No.: 15/138,521

(22) Filed: Apr. 26, 2016

(65) Prior Publication Data

US 2016/0241550 A1     Aug. 18, 2016

Related U.S. Application Data

(63) Continuation of application No. 14/228,413, filed on Mar. 28, 2014, now Pat. No. 9,332,008.

(51) Int. Cl.
| | |
|---|---|
| *H04L 29/06* | (2006.01) |
| *H04W 12/06* | (2009.01) |
| *G06F 21/45* | (2013.01) |
| *H04L 9/32* | (2006.01) |

(52) U.S. Cl.
CPC .......... *H04L 63/0838* (2013.01); *G06F 21/45* (2013.01); *H04L 9/3228* (2013.01); *H04L 63/0846* (2013.01); *H04W 12/06* (2013.01); *H04L 63/0815* (2013.01); *H04L 63/108* (2013.01)

(58) Field of Classification Search
CPC .................................................. H04L 63/0838
See application file for complete search history.

(56) References Cited

U.S. PATENT DOCUMENTS 6,067,621 A * 5/2000 Yu ........................... G06F 21/34
                                                              713/168
7,793,340 B2   9/2010 Kiester et al.
(Continued)

FOREIGN PATENT DOCUMENTS

CN          102902553 B  *  9/2015

OTHER PUBLICATIONS

"CA ArcotOTP Versatile Authentication Solution for Mobile Phones", [Online]. Retrieved from the Internet: <URL: http://www.ca.com/~/media/Files/ProductBriefs/ca_arcototp_for_mobile_authentication_product_sheet.pdf>, (2011), 7 pgs.
(Continued)

*Primary Examiner* — Shawnchoy Rahman
(74) *Attorney, Agent, or Firm* — Schwegman Lundberg & Woessner, P.A.

(57) ABSTRACT

A Time-based One-Time Password (TOTP) validator is interposed between a principal and a network service. The validator interacts with a mobile application (app) on the mobile device associated with the principal to dynamically supply a validator secret. The secret and, perhaps, other information are processed by the app to generate a TOTP when the principal attempts to access a protected resource of the network service. The validator independently generates the TOTP and compares the app generated TOTP, and on a successful match, a principal's access device is redirected for access to the protected resource.

10 Claims, 6 Drawing Sheets

(56) References Cited

U.S. PATENT DOCUMENTS

| | | | |
|---|---|---|---|
| 7,904,946 B1* | 3/2011 | Chu | H04L 63/067 726/10 |
| 8,359,273 B2 | 1/2013 | Leleu | |
| 8,719,568 B1* | 5/2014 | Antypas, III | H04L 9/14 713/168 |
| 9,009,793 B2 | 4/2015 | Sancheti et al. | |
| 9,332,008 B2 | 5/2016 | Burch et al. | |
| 9,768,963 B2* | 9/2017 | Chu | H04L 9/3228 |
| 2005/0010758 A1 | 1/2005 | Landrock et al. | |
| 2006/0018481 A1* | 1/2006 | Nagano | H04L 9/3271 380/270 |
| 2007/0050635 A1 | 3/2007 | Popp | |
| 2007/0130462 A1* | 6/2007 | Law | H04L 63/045 713/168 |
| 2008/0034216 A1 | 2/2008 | Law | |
| 2009/0064294 A1 | 3/2009 | Cook et al. | |
| 2009/0154707 A1* | 6/2009 | Lee | H04L 9/0822 380/278 |
| 2009/0172775 A1 | 7/2009 | Mardikar et al. | |
| 2010/0049975 A1 | 2/2010 | Parno et al. | |
| 2010/0070759 A1 | 3/2010 | Leon Cobos | |
| 2010/0099380 A1 | 4/2010 | Chen | |
| 2011/0026716 A1 | 2/2011 | Tang et al. | |
| 2011/0030053 A1 | 2/2011 | Lin et al. | |
| 2011/0113245 A1* | 5/2011 | Varadarajan | G06F 21/34 713/168 |
| 2011/0289576 A1 | 11/2011 | Cheng | |
| 2011/0307699 A1* | 12/2011 | Fielder | H04L 63/123 713/172 |
| 2012/0151566 A1* | 6/2012 | Lin | H04L 63/0428 726/7 |
| 2013/0014237 A1 | 1/2013 | Krogh | |
| 2013/0145449 A1* | 6/2013 | Busser | G06F 21/31 726/7 |
| 2013/0227661 A1 | 8/2013 | Gupta et al. | |
| 2013/0276078 A1 | 10/2013 | Rockwell | |
| 2014/0068739 A1* | 3/2014 | Taratine | G06F 21/34 726/7 |
| 2015/0046327 A1* | 2/2015 | Taupitz | G06Q 20/227 705/44 |
| 2015/0082399 A1* | 3/2015 | Wu | G06F 21/6209 726/6 |
| 2015/0089607 A1* | 3/2015 | Hubner | H04L 63/0838 726/6 |
| 2015/0281222 A1 | 10/2015 | Burch et al. | |
| 2016/0277363 A1* | 9/2016 | Kaladgi | H04L 63/0838 |

OTHER PUBLICATIONS

"Google-authenticator: Two step verification", [Online]. Retrieved from the Internet: <URL: http://code.google.com/p/google-authenticator/>, (Accessed Jan. 28, 2014), 2 pgs.

"How do I enable two-step verification on my account?", [Online]. Retrieved from the Internet: <URL: https://www.dropbox.com/help/363/en>, (Accessed Jan. 28, 2014), 4 pgs.

"TOTP—Time-Based One-Time Password Algorithm and Authentication", [Online]. Retrieved from the Internet: <URL: http://www.solidpass.com/authentication-methods/totp-time-based-one-time-password.html>, (Accessed Jan. 28, 2014), 3 pgs.

\* cited by examiner

TIME-BASED ONE TIME PASSWORD (TOTP) FOR NETWORK AUTHENTICATION

This application is a continuation of U.S. patent application Ser. No. 14/228,413, filed Mar. 28, 2014, which is incorporated herein by reference in its entirety.

BACKGROUND

Many companies are using multifactor authentication to provide a higher level of security to the services that they are providing. A common technique is to issue a token device that is used to generate a 4-6 digit code, based on the "Time Of Day" (TOD) and an internal algorithm with a secret key. This 4-6 digit code changes every few minutes and is input by the user, when prompted after he/she has input his/her name and password or some other form of authentication. Before the token device can be used, a device-specific secret key is registered with the server for each user, and may be kept on a server as part of the user's identity. Each new device requires that a new entry is added to the data store for the user. Each user has a unique entry for each device, which is stored on the authenticating server's data storage. Many times this is done as part of the user's identity store such as Lightweight Directory Access Protocol (LDAP) store, but can also be a separate data store. These token devices can be small hardware devices that can be stored on a user's key chain, such that the user can look at a small display and read the Time-based One Time Password (TOTP) each time he/she needs to enter his/her TOTP value. Smart mobile devices with custom applications are starting to replace the hardware-based tokens by generating the time-based tokens for the user.

The technique of providing a one-time password word works fine when the user has an identity that is stored in a directory that can be updated with the device-specific key. The problem comes when there is not a writeable-user object or no user object at all, for a user wishing to use a TOTP approach. This has not been a real issue in the past because there has been a user object that was used to validate the password or other credentials.

Social networks have changed the landscape, by providing a simple single-sign on technique of authenticating to a service without a user store at the service. The service uses the identity data from a social service such as Facebook®, and keeps nothing else. The problem is that the service may need or may want more validation than Facebook® can provide. To use TOTP, the service needs to store a secret for each token device that is registered, even if there is not an account for the end user at the service. This new data storage requirement adds a cost to the service, which can be from 10 cents to $1 per year for each user. With accessed systems of social networks there is the potential of tens of thousands, hundreds of millions, or even billions of users. This can add a large recurring cost to the service for the extra security. With the use of mobile devices as the token device, the cost of the token devices becomes low or zero, but there is a cost of keeping the device key at the service (and each user may have multiple devices). In large environments were servers must be clustered, the cost of keeping a shared and fault tolerant database can be very high.

SUMMARY

Various embodiments of the invention provide techniques for Time-based One Time Passwords (TOTPs) for network authentication. In an embodiment, a method for handing a TOTP of a network service is presented.

Specifically, a token is received and validated. Next, a login by a principal to a network service is detected. A unique identity, supplied by the network service to the principal after a successful login, is obtained. Next, a TOTP secret is generated based at least in part on the unique identity and a secret. Finally, the TOTP secret is provided to a mobile application of a mobile device associated with the principal for authentication when the principal attempts to access a protected resource of the network service, and the TOTP secret is removed from the server once provided to the mobile application.

DETAILED DESCRIPTION

Figure 1A:
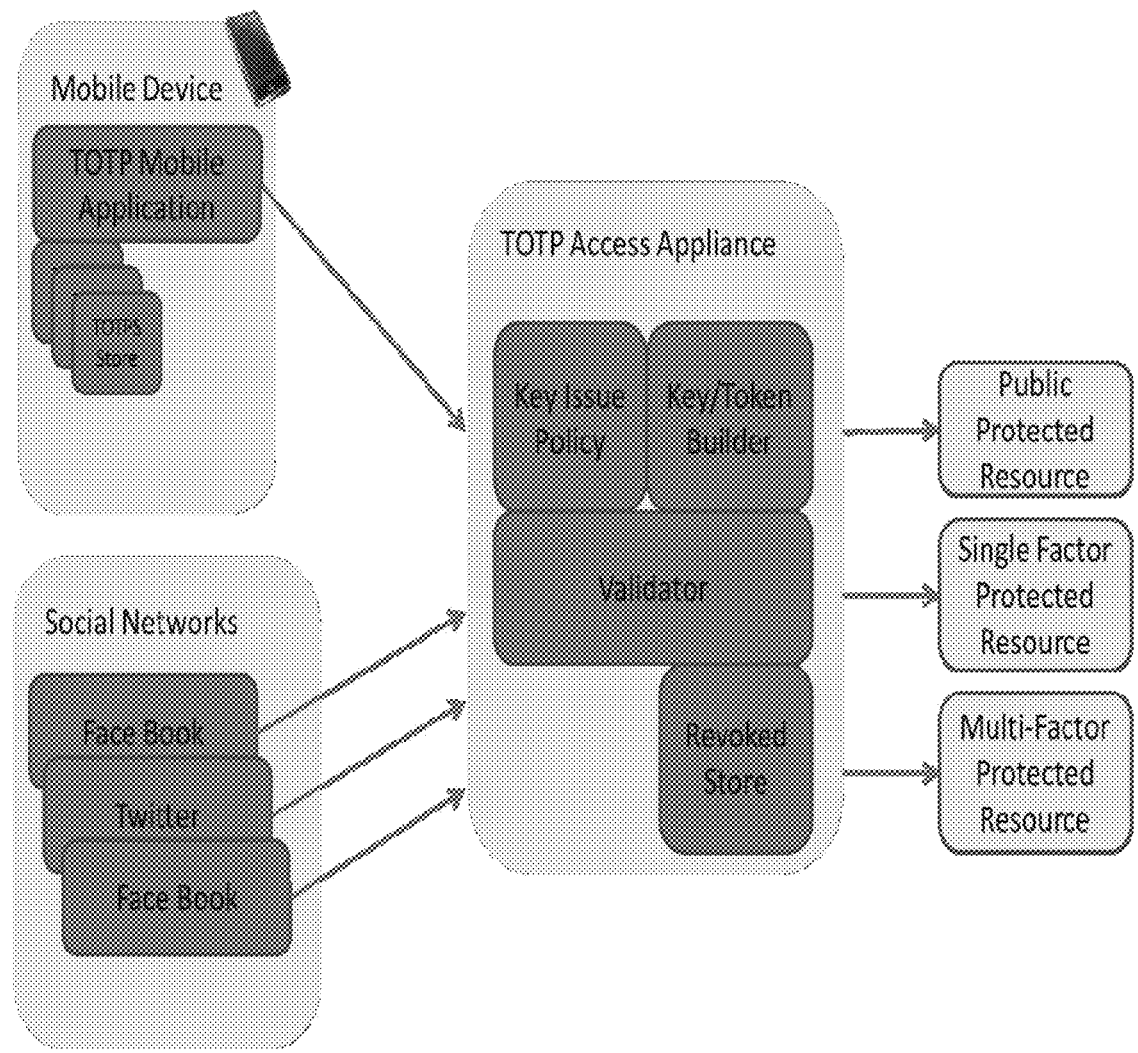
FIGS. 1A-1C flow diagrams depicting architectures and processing of processing Time-based One Time Passwords (TOTPs) for social networks, according to an example embodiment presented herein.

A "resource" includes a user, service, system, device, directory, data store, groups of users, files, combinations and/or collections of these things, etc. A "principal" is a specific type of resource, such as an automated service or user that at one time or another is an actor on another principal or another type of resource. A designation as to what is a resource and what is a principal can change depending upon the context of any given network transaction. Thus, if one resource attempts to access another resource, the actor of the transaction may be viewed as a principal. Resources can acquire and be associated with unique identities to identify unique resources during network transactions.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X and be logically combined with another computing resource at network site Y to form a logical processing environment.

The phrases "processing environment," "cloud processing environment," and the term "cloud" may be used interchangeably and synonymously herein.

Moreover, it is noted that a "cloud" refers to a logical and/or physical processing environment as discussed above.

Various embodiments of this invention can be implemented as enhancements within existing network architectures.

Also, the techniques presented herein are implemented in (and reside within) machines, such as processor(s) or processor-enabled devices (hardware processors). These machines are configured and programmed to specifically perform the processing of the methods and system presented herein. Moreover, the methods and system are implemented and reside within a non-transitory computer-readable storage media or machine-readable storage medium and are processed on the machines (processors) configured to perform the methods.

Of course, the embodiments of the invention can be implemented in a variety of architectural platforms, devices, operating and server systems, and/or applications. Any particular architectural layout or implementation presented herein is provided for purposes of illustration and comprehension of particular embodiments only and is not intended to limit other embodiments of the invention presented herein and below.

It is within this context that embodiments of the invention are now discussed within the context of the FIGS. 1A-1C and 2-4.

Figure 1B:
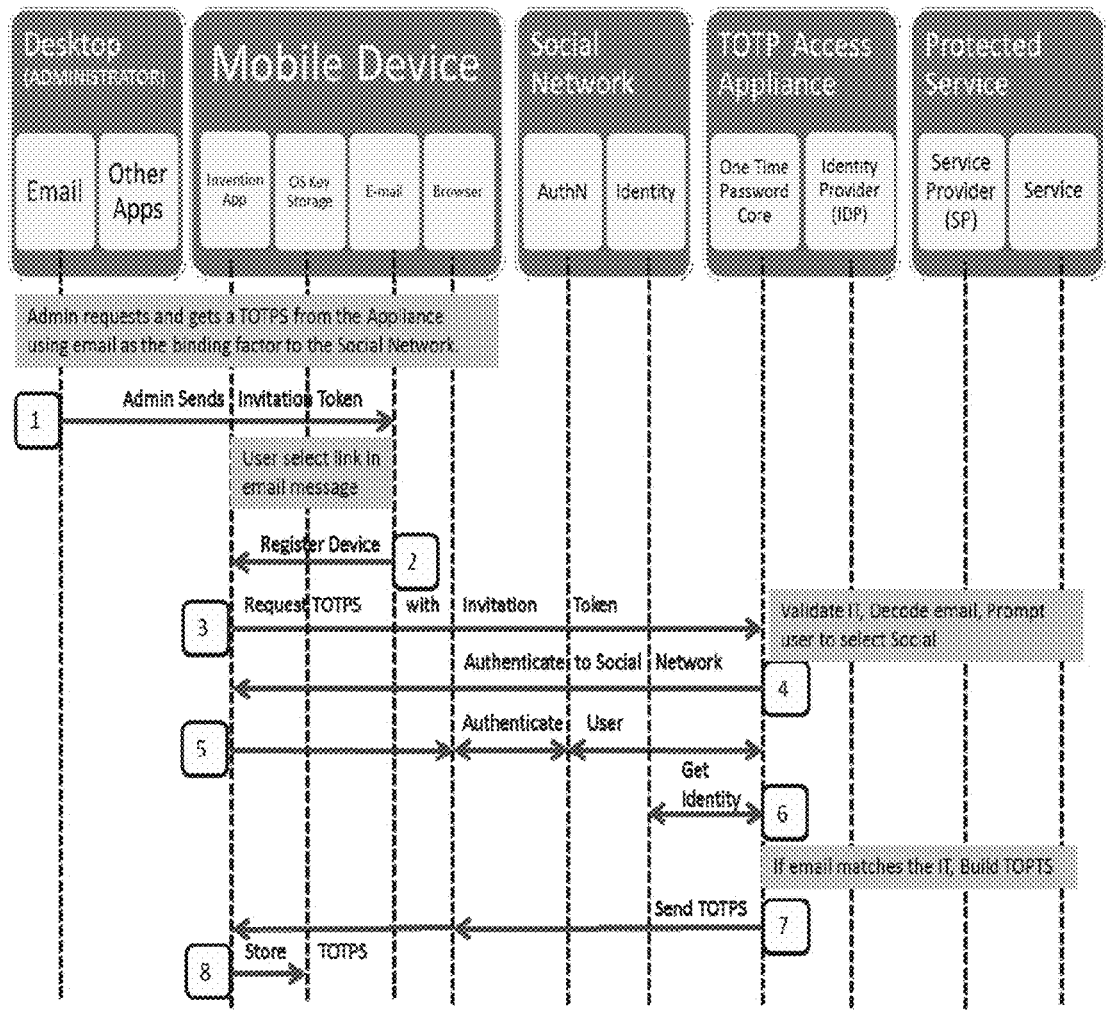
Figure 1C:
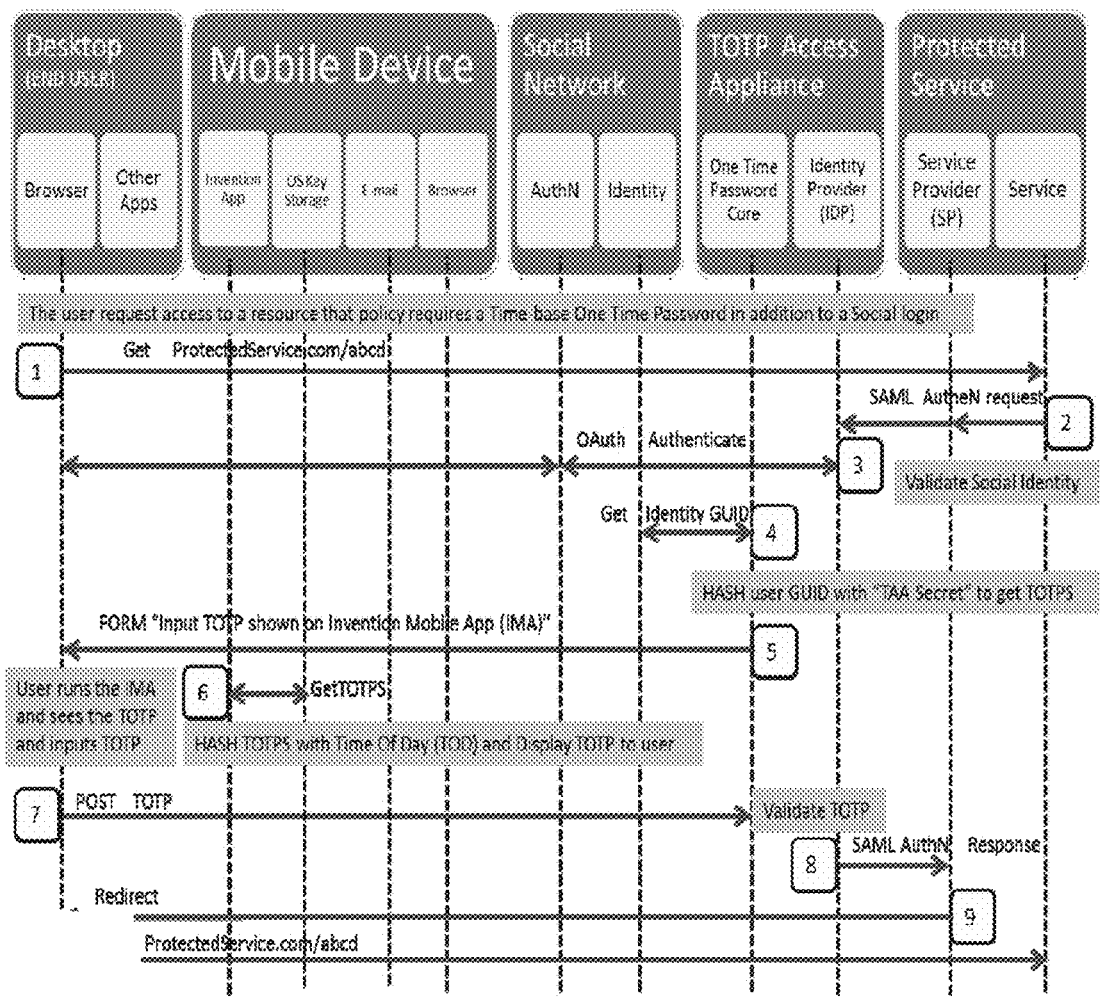

FIGS. 1A-1C flow diagrams depicting architectures and processing of processing TOTPs for social networks, according to an example embodiment presented herein. The FIG. 1A depicts an example architecture for performing TOTP authentication processing for users of social networks.

The architecture of the FIG. 1A is shown for purposes of illustration of particular embodiments of the invention; it is noted that other embodiments of the invention (FIGS. 2-4) need not be limited to these architecture of the FIG. 1A, as other hardware and software architectures can be used as well.

As embodiments herein and below will demonstrate, the data storage issue believed to be insurmountable for social networks to efficiently provide TOTP authentication becomes a nonissue. The embodiments allow mobile devices, such as an iPhones® to be used as the device token by simply loading and using a mobile application, and the embodiments allow an enhanced social networking service to provide a registration process that can be used to force policy on the use of the device token. This TOTP approach can be required for all access or only used as a "step-up," or multi-factor authentication for some protected resources (based on the needs of the social network or services provided by that social network).

Embodiments of the invention have three main parts or processing flows to it. The first part includes is a "Time-based One Time Password Secret" (TOTPS) deployment service that securely delivers secrets to mobile devices. The second part is the TOTP generator for a mobile device, which builds a TOTP on the mobile device and displays it to the user. The third part is the validation of the TOTP from the mobile device at the social network service or social network authentication server.

The FIG. 1A depicts an architecture for practicing the three parts of the embodiments discussed herein. The architecture includes a mobile device (such as a smart phone but could be any mobile device selected from laptops, phones, tablets, wearable processing devices (GOOGLE GLASS®, smart watch, etc.), and the like), The architecture also includes one or more social networks (such as Facebook®, Twitter®, or different servers associated with a same social network (second instance of Facebook® in the diagram 100 of the FIG. 1. The architecture also includes a TOTP access appliance that services access to a protected resource, a single-factor authentication protected resource, and/or a multi-factor authentication protected resource.

PART 1—Token Secret Deployment:

For the mobile device to be a valid TOTP generator it must be trusted by the TOTP service. This trust is setup by delivering an "Invitation Token" (IT) to the mobile device. Ownership of the IT gives the rights to request a TOTPS. The TOTPS is used by the mobile device (may also be referred to as a "mobile client" herein) to generate the TOTP. The TOTP is used to validate possession of the device and secret (further details on this are described more completely herein and below).

For purposes of illustration an example operation scenario for embodiments of the invention a Security Assertion Markup Language federation approach is described for connecting to a "protected service," The protected service acts as a Service Provider (SP) to the TOTP access appliance. Moreover, email is used as an out-of-band delivery mechanism for providing the IT to the user of the mobile device. It is to be noted that this is not the only mechanism for delivering the IT to the mobile device; thus, embodiments herein are not to be restricted to just email-based IT delivery mechanisms.

FIG. 1B is a sample illustration of the IT distribution and TOTP generation.

The process starts with an administrator requesting an IT from the TOTP Access Appliance (hereinafter referred to as "TAA"). This request is done in a secure manner and is not shown in the FIG. 1B. This can be a single request or an automated workflow or other process. When requesting the IT from the TAA, identity data about the user may be included in the request. The IT can include a "Time To Live" (TTL) attribute that limits the time that the IT can be used, In this example, the IT is distributed to the end user's email. This identity data is optional and can be any data know about the user's social identity.

At 1, the admin sends an email message to the end user that includes a link to acquire the mobile application (mobile app) on the end user's mobile device; the IT is included in this link. This could also be an automated process occurring though an automated workflow or a manual process. The email may also include a link to automatically load the mobile app on the device.

At 2, the end user reads the email and selects the link in the email that includes the IT. This starts the "Mobile App" (MA) on the mobile device and passes the IT with a "Register IT Request."

At 3, the MA requests a TOTPS from the TAA. The IT is passed to the TAA from the MA in the request. The TAA validates the IT. If the IT includes user identity data the data is decrypted. Based on policy, which may include any data available to the TAA (for example user data, social network list, and other company policy), a list of allowed social networks is built.

At 4, the user is prompted to select a supported social network and then the TAA returns the results of the policy evaluation to the MA. The MA then uses mechanisms on the device, such as the browser to complete authentication to the social network.

At 5, and if needed, the user inputs his/her social network credentials. This process may vary from one social network to another. When authenticated, the user receives an access token from the social network. It is to be noted that not all social login techniques are shown for the illustration; thus, others are possible without departing from the teachings herein.

At 6, the access token is used by the TAA to read social network identity data about the user. If policy requires, the data read is compared to the data included in the original IT, in the present example the email address is compared. A unique social network identity globally-unique identifier (GUID) is also read from the social network. This GUID becomes the base of or seed for the TOTPS. The GUID and a TAA secret are combined together and hashed into a non-reversible key that is used as the TOPTS.

At 7, the TOTPS is sent to the MA.

At 8, the TOPTS is stored in the device's "key chain" by the MA. The mobile device now has a secret key that it holds in its key store. The TAA can calculate the same secret later during authentication. A "key chain," as used herein, is a secure secrets store suitable for keys, certificates, tokens, and secrets. A "key store" may also refer to a key store, a credential store, an account database, and an account manager.

PART 2—Token Secret Use:

FIG. 1C illustrates a process flow for two-factor authentication, according to an example embodiment. Again, SAML is used for the remote authentication and open standard for authentication (OAuth) is used to authenticate to the social network. These are example types of authentication mechanisms; others may be used as well without departing from the beneficial teachings provided herein.

At 1, the user uses his/her browser to access a protected service that requires two-factor authentication. The first factor is to user the user's social network authentication. The second factor is to use TOTP, according to embodiments herein. It is to be noted that the processing for FIG. 1C at 1-4 and 8-10 are used only to show how an embodiment can be used in a company-hosted environment or by Software as a Service (SaaS) vendor; other arrangements for the processing of the FIG. 1C at 1-4 and 8-10 can also be used without departing from the teachings herein, At 2, because the protected service is not authenticated, the user is redirected to the SAML Service Provider (SP) and then sent to a trusted Identity Provider (IDP).

At 3, the IDP is configured to enforce two-factor authentication. The first factor uses a social network, such as Facebook®. Moreover, the example uses OAuth 2.0 for authentication. An access token is returned after a successful authentication.

At 4, the OAuth access token is used to read the user's identity information. The user's GUID and other optional attributes are read.

At 5-7, beneficial aspects of the invention are realized. Specifically, at 5, the social network GUID of the user and the TAA secret are used in a hash algorithm to produce a TOTPS. The user is then prompted to enter the "TOTPS via a form sent to the user's browser. The user runs the MA application on his/her mobile device.

At 6, the MA read the TOTPS, which is stored in the key chain and hashes it with the "Time Of Day" (TOD), and then, the MA displays the results as the TOTP. The end user types (enters) the TOTP into the browser form on his/her desktop. Then, the browser submits the form.

At 7, the form is sent to the TAA, The TAA hashes the TOD with the TOTPS, which was calculated at 5. The two TOTP are compared. If the two TOTPs (user provided and TAA generated) match the user is successfully authenticated, if no match, then, the process is repeated for a time just before or after the current TOD. The TOD match may, in an embodiment, use the same mechanisms that are already used by current TOTP devices. The processing at 7 may be repeated for each valid TAA secret.

At 8, the DP returns a valid SAML token to the SP.

At 9, the SP redirects the browser back to the protected resource.

At 10, the user's browser on the mobile device is allowed access to the protected resource.

PART 3—TOTP Access Appliance Secret Management

In various embodiments, the TAA secret that is used to build the TOTPS can be a single secret or one of many secrets based on policy and security needs. The TAA secret selection can be based on an identity source as well as data that is read from the user's social network identity, time/date or other configured policies.

Moreover, the TAA may change its secrets at specified time periods, to limit the time that a mobile device's TOTPS is valid. The administrator can select this time base for each TAA. For example, the TAA secret can change every month. This would mean that a TOTP built from a TOTPS, which is more than a month old, would fail to validate.

In addition to the time-base limit of the TAA secret, the administrator can also select the number of TAA secrets the can be active at any given point in time. For example, the administrator could select the last three TAA secrets as being active. Such a scenario would allow a user to use his/her TOTPS for three months before the TAA would not validate the TOTP from the device.

The administrator may also setup an automatic refresh of the TOTPS. This would update the TOTPS on the mobile device if the TOTPS used a key that was older than a given numbers of secrets. In this way, active users do not need to keep receiving a new IT each month. Each time a user uses the TOTP, checks are made to ensure that the TAA secret was used to validate the TOTP and if the TAA secret is older than specified and configured requirements, a new TOTPS is deployed to the mobile device. The TOTPS update is based on policy that may include the user's identity data, location, and other input data.

Token Revocation

Because there is no server-side data store for devices that have valid TOTPS, there is a provided mechanism to revoke issued tokens.

If the TOTPS is being revoked because of a security loss of the TAA secret, the secret of the TAA is removed and a policy is defined detailing how the mobile devices can gain a new TOTPS.

If only a single mobile device needs to be disabled, a record is added to a "hot list." The hot list includes the user's name, social network, a GUID from that social network, a reference to the TAA secret used to build the TOTPS, and a secure random number. When a user uses the TOTP and the GUID from the social network that matches a GUID in the "Hot List", the random number is added as part of the hash to calculate the TOTP. So, any lost device will not know the random number to use and any TOTP sent by that lost device will not match. If the user on the hot list wishes to register a new device the secret sent to the device will use the random number as part of its hash calculation. Once the T AA secret used to build the TOTPS for the lost device has expired, the hot list entry can be deleted.

Techniques herein are improvements over preexisting technology because the protected service is not required to have an account or anything else stored. Other technologies require server-side storage to use TOTPs. The techniques herein have signification advantages where social network deployments are used as one of the authentication factors.

Socially authenticated services can have millions or even billions of potential accounts and to remove the storage space and data liability is of great value.

Moreover, embodiments herein provide novel benefits for large organizations that wish to add TOTP based authentication to their services. Even though these companies may have a directory with their users represented therein, it is sometimes very difficult to get permission to change the directory schema or add a new database that holds credentials. In fact, many times corporate policy forbids such changes. The techniques herein also limit the risk of secret exposure because there is not a single server to hack and get the needed keys.

Furthermore, when techniques herein are hosted in a cloud environment, the techniques have an advantage of not having user keys and secrets stored on the cloud.

Still further, the techniques herein can be applied to any service that needs or wants to use TOTP-based approach. The techniques can be hosted by a single company or can be a shared service hosted in the cloud as a SAAS service. Moreover, the techniques can be used to protect on premise, off premise, and hosted SAAS services in a cloud.

Figure 2:
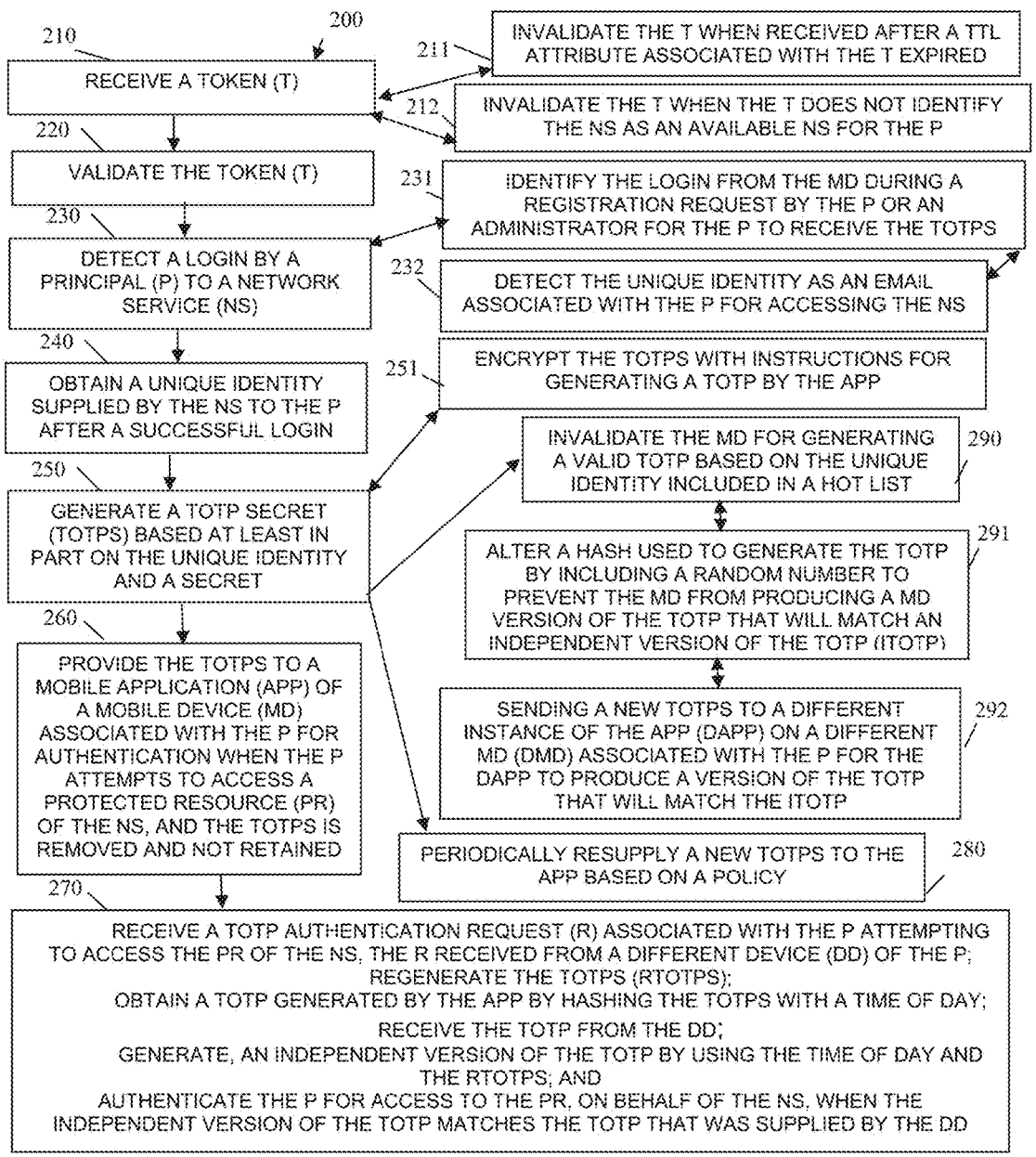
FIG. 2 is a diagram of a method for handing a TOTP of a network service, according to an example embodiment.
Figure 3:
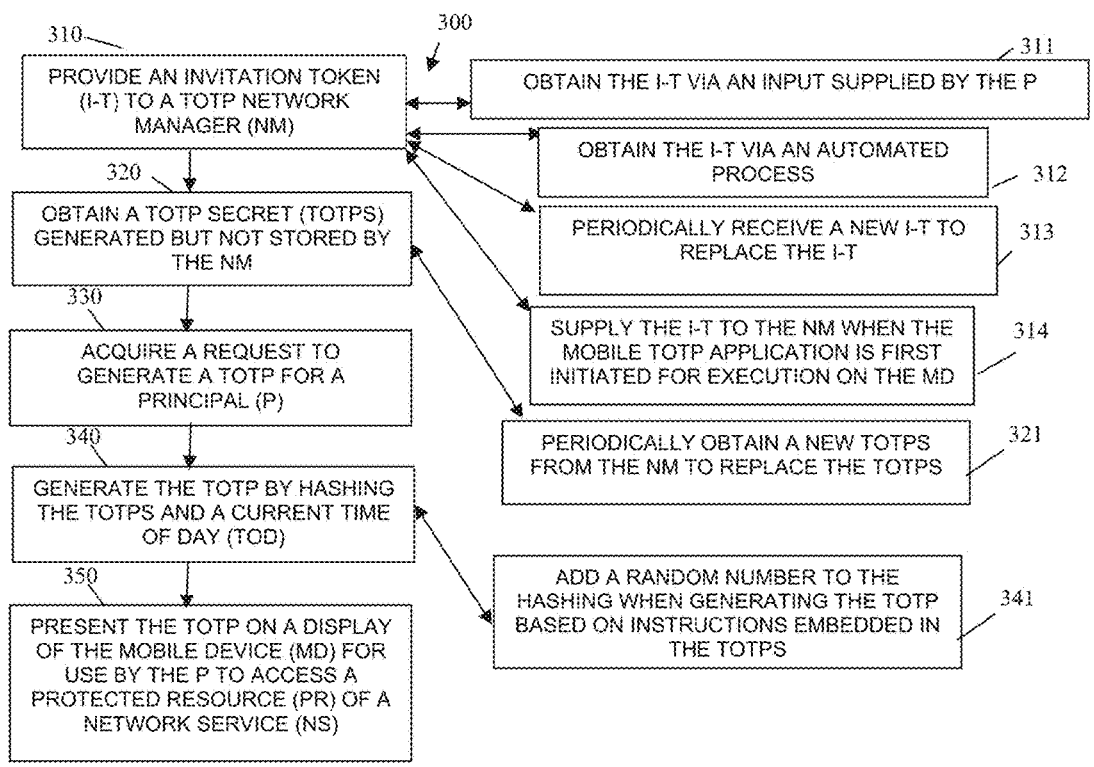
FIG. 3 is a diagram of a method for handing a TOTP on a mobile device, according to an example embodiment.
Figure 4:
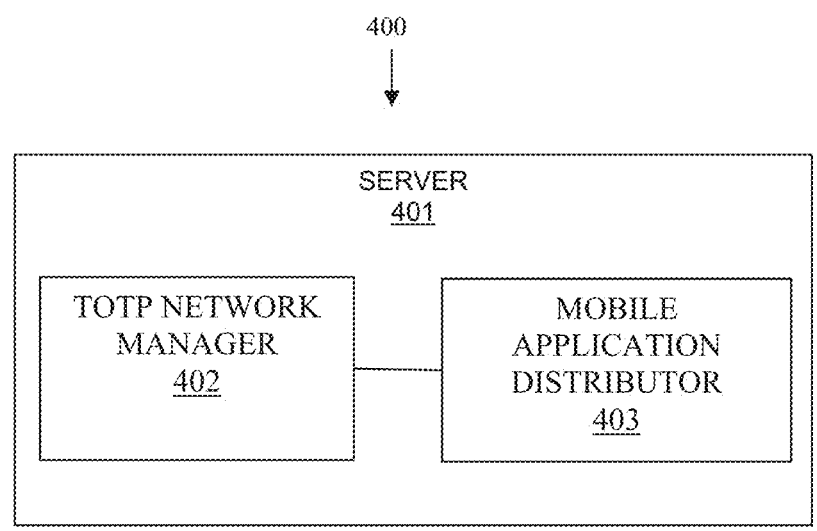
FIG. 4 is a diagram of a TOTP network processing system, according to an embodiment.

Aspects of the embodiments discussed above and other embodiments are now presented with the discussion of the FIGS. 2-4.

FIG. 2 is a diagram of a method 200 for handing a TOTP of a network service, according to an example embodiment. The method 200 is implemented as one or more software modules (herein after referred to as "TOTP network manager"). The TOTP network manager includes executable instructions that are implemented, programmed, and resides within memory and/or a non-transitory machine-readable storage media; the executable instructions execute on one or more processors of a server device and have access to one or more network connections associated with one or more networks. The networks may be wired, wireless, or a combination of wired and wireless.

In an embodiment, the TOTP network manager processes on hardware platforms associated with a cloud environment.

In an embodiment, the TOTP network manager processes on hardware platforms controlled by a social network.

In an embodiment, the TOTP network manager is provided as a SaaS.

At 210, the TOTP network manager receives a token, such as the invitation token discussed above with reference to the FIGS. 1A-1C. The token is received from a mobile application that processes on a mobile device of a principal.

According to an embodiment, at 211, the TOTP network manager invalidates the token when received after a time-to-live attribute associated with the token is determined by the TOTP network manager to have expired.

In an embodiment, at 212, the TOTP network manager invalidates the token when the token does not identify the network service as an available network service for the principal. In an embodiment, the network service is a social network service.

In an embodiment, the token is encrypted and signed by either the TOTP network manager and distributed through a different process of the TOTP network manager or a trusted third-party service of the TOTP network manager. The encrypted token can include a variety of information, such as identifiers for the network service or services to which the token grants access to the principal to use the token and identity information associated with the principal.

At 220, the TOTP network manager validates the token. Various options for performing the validation were discussed above with reference to the FIGS. 1A-1C.

At 230, the TOTP network manager detects a login by a principal to a network service. This was described above with reference to the FIG. 1B.

According to an embodiment, at 231, the TOTP network manager identifies the login from the mobile device during a registration request by the principal or an administrator for the principal to receive the TOTPS (discussed below).

In an embodiment of 231 and at 232, the TOTP network manager detects the unique identity (discussed below) as an email associated with the principal for accessing the network service.

At 240, the TOTP network manager obtains the unique identity supplied by the network service to the principal after a successful login. It is noted this can be any GUID that the network service assigns to the principal. It is also noted that in some embodiments the principal is a user and in other embodiments the principal is an automated service.

At 250, the TOTP network manager generates a TOTPS based at least in part on the unique identity and a secret held just by the TOTPS. The TOTP network manager is capable of independently reproducing the TOTPS for the principal (and other TOTPS for other principals, each TOTPS specific to a specific principal).

According to an embodiment, at 251, the TOTP network manager encrypts the TOTPS with instructions for generating a TOTP by the mobile application. These instructions may be as simple as identifying the data elements that are to be fed to the hash algorithm that resides on the mobile application and is used for generating the TOTPS.

At 260, the TOTP network manager provides the TOTPS to a mobile application of a mobile device associated with the principal. The principal uses the mobile application to authenticate when the principal accesses a protected resource of the network service requiring a higher-level or multi-factor authentication for access. Once the TOTPS is generated by the TOTP network manager, the TOTPS is removed and is not retained by the TOTP network manager or the processing environment associated the TOTP network manager. So, the TOTP network manager has retained no data with respect to the principal, the mobile device, or the mobile application and yet, the TOTP network manager can provide TOTP authentication for the principal to the network service (as discussed above and below).

According to an embodiment, at 270, the TOTP network manager subsequent to the processing at 260 receives a TOTP authentication request associated with the principal who is attempting to access the protected resource of the network service.

In an embodiment, the request was initiated by a different device from the mobile device associated with the principal.

In an embodiment, the request is initiated by the mobile device of the principal.

Continuing with the embodiment of 270, the TOTP network manager regenerates the TOTPS using the TOTP network manager secret and a unique identity for the principal (supplied by the network service when the principal performed initial first-factor authentication with the network service, which then generated the request when the principal once logged into the network service tried to access the protected resource of the network service). Next, the TOTP network manager obtains a TOTP generated by the mobile application that hashes the TOTPS with a current TOD and the TOTP network manager receives that mobile-application generated TOTP from the different device (or in some cases the mobile device, as discussed above).

Still continuing with 270, the TOTP network manager generates its own independent version of the TOTP by using the regenerated TOTPS and the TOD (note the TOTP hashing algorithms uses intervals of time, such that if the TOTP network manager is within the interval during which the mobile application generated its TOTP, the version of the TOTP network manager and the mobile application TOTP will be the same—when they are not the same the TOTP network manager can request a new TOTP from the mobile application and repeat the checking for a configured number of iterations).

Again, at 270, the TOTP network manager authenticates the principal for access to the protected resource (on behalf of the network service) when the independent version of the TOTP produced by the TOTP network manager matches the TOTP supplied by the principal (either through the mobile device or a different device, such as a desktop of the principal or a different mobile device of the principal).

In an embodiment, at 280, the TOTP network manager periodically resupplies a new TOTPS to the mobile application based on a policy evaluation.

According to an embodiment, at 290, the TOTP network manager invalidates the mobile device for generating the TOTP based on the unique identity included in a hot list.

In an embodiment or 290 and at 291, the TOTP network manager achieves this invalidation by altering a hash used to generate the TOTP to include a random number to prevent the mobile device from producing a mobile-device version of the TOTP (through its instance of the mobile application) that is capable of matching an independent version of the TOTP produced by the TOTP network manager.

In an embodiment of 291 and at 292, the TOTP network manager sends a new TOTPS to a different instance of the mobile application on a different mobile device associated with the principal for the different instance of the mobile application to produce a version of the TOTP that will match the independent version of the TOTP produced by the TOTP network manager.

It is noted that the processing of 290-291 is particularly useful when a principal has a mobile device stolen or lost.

It should be now full appreciated how a network-based authenticator (the TOTP network manager) can assist a network service (such as a social network service) in providing enhanced multi-factor authentication to protected resources. This not only saves significant storage space and thereby expense because no information is stored in the process, but also may allow the network service to upsell value-added security services to its subscribers by providing the added security (multi-factor authentication).

FIG. 3 is a diagram of a method 300 for handing a TOTP on a mobile device, according to an example embodiment. The method 300 is implemented as one or more software module(s) (herein after referred to as "mobile TOTP app"). The one or more software module are represented as executable instructions that are implemented, programmed, and resides within memory and/or a non-transitory machine-readable storage medium; the executable instructions execute on one or more processors of a mobile device and have access to one or more network connections associated with one or more networks. The networks may be wired, wireless, or a combination of wired and wireless.

In an embodiment, the mobile TOTP app processes on a smart phone.

In an embodiment, the mobile TOTP app processes on a tablet device.

In an embodiment, the mobile TOTP app processes on a wearable processing device.

In an embodiment, the mobile TOTP app processes on a laptop computing device.

The mobile TOTP app interacts with the TOTP network manager, discussed above with reference to the FIG. 2.

At 310, the mobile TOTP app provides an invitation token to a TOTP network manager, such as the TOTP network manager, discussed above with reference to the FIG. 2. Moreover, various embodiments, on how the invitation itself is issued and received by the mobile TOTP app were presented above with reference to the FIG. 1B.

According to an embodiment, at 311, the mobile TOTP app obtains the invitation token via an input supplied by the principal. So, the mobile TOTP app includes a forward facing principal interface and an Application Programming Interface (API) for communicating with the mobile TOTP app.

In an embodiment, at 312, the mobile TOTP app obtains the invitation token via an automated process, such as through another API permitting automated applications to communicate with the TOTP.

According to an embodiment, at 313, the mobile TOTP app periodically receives a new invitation token to replace the invitation token.

In an embodiment, the mobile TOTP app receives a set of valid invitation tokens for a configured period of time, which can be used and managed by the mobile TOTP app.

In an embodiment, at 314, the mobile TOTP app supplies the invitation token to the TOTP network manager when the mobile TOTP app is first initiated for execution on the mobile device.

At 320, the mobile TOTP app obtains a TOTPS, which was generated and supplied by the TOTP network manager but not stored by the TOTP network manager (but capable of being reproduced by the TOTP network manager based on identity information supplied by a network service that a particular principal is accessing).

In an embodiment, at 321, the mobile TOTP app periodically obtains a new TOTPS from the TOTP network manager to replace the TOTPS. That is, the TOTPS is only valid for a period of time set by policy or until an event occurs defined by the policy and the policy is controlled by the TOTP network manager.

At 330, the mobile TOTP app acquires a request to generate a TOTP for a principal. The principal already logged into a network service (first factor authentication) and is attempting to perform a second factor authentication using the TOTP. The principal can be accessing the network service via another application on the mobile device or on a completely different device from the mobile device.

At 340, the mobile TOTP app generates the TOTP by hashing the TOTPS and a current TOD.

In an embodiment, at 341, the mobile TOTP app adds a random number to the hashing when generating the TOTP based on instructions (data input to the hashing) embedded or encrypted in the TOTPS.

At 350, the mobile TOTP app presents the TOTP on a display of the mobile device for use by the principal to access a protected resource of the network service.

FIG. 4 is a diagram of a TOTP network processing system 400, according to an embodiment. Various components of the TOTP network processing system 400 are software module(s) represented as executable instructions, which are programed and/or reside within memory and/or non-transitory computer-readable storage media for execution by one or more devices. The components and the devices have access to one or more network connections over one or more networks, which are wired, wireless, or a combination of wired and wireless.

According to an embodiment, the TOTP network processing system 400 implements, in whole or in part and inter alia, various features of the FIGS. 1A-1C and 2-3.

The TOTP network processing system 400 includes a server 401, a TOTP network manager 402, and a mobile app distributor 403.

The server 401 includes one or more processors, memory, and non-volatile storage.

In an embodiment, the server 401 is a cloud processing environment.

In an embodiment, the server 401 is controlled or acts as an authentication device for social networking servers.

The server 401 includes the TOTP network manager 402 and the mobile app distributor 403.

The TOTP network manager 402 is implemented as one or more software modules having executable instructions that execute on the one or more processors of the server 401. The TOTP network manager 402 is configured and adapted to: generate a TOTPS for a principal; supply the TOTPS to the principal; remove the TOTPS from the server; regenerate the TOTPS to produce a server TOTPS on a per authentication basis; and authenticate a principal for access to a protected resource of a network service by comparing a principal-supplied TOTP to the server TOTP.

In an embodiment, the TOTP network manager 402 when executed provides TOTP authentication to network services from mobile devices.

In an embodiment, the mobile app distributor 402 is the TOTP network manager of the FIG. 2.

The mobile app distributer 403 is implemented as one or more software modules having executable instructions that execute on the one or more processors of the server 401. In an embodiment, the mobile app distributor 403 when executed provides mobile apps to mobile devices for interacting with the TOTP network manager 402 for TOTP-based authentication with a network service.

In an embodiment, the mobile app distributor 403 configures and distributes instances of mobile TOTP apps to mobile devices, the instances configured to process as detailed in the FIG. 3, above.

The mobile app distributor 403 is configured and adapted to: execute on the server 401; configure a mobile TOTP application to communicate with the TOTP network manager 402 and to receive the TOTP secret and use the TOTP secret to generate the principal-supplied TOTP on behalf of the principal; and deliver the mobile TOTP application to execute on a mobile device associated with the principal.

In an embodiment, the mobile device is a smart phone, the network service is a social network service, the TOTP network manager 402 is a SaaS, and the server 401 is a cloud processing environment.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:

providing, by a mobile device, an invitation token to a Time-based One-Time Only Password (TOTP) manager that processes on a server;

obtaining, by the mobile device, a TOTP secret that is generated by the TOTP manager, and removed by the TOTP manager once the TOTP secret is provided by the TOTP manager to the mobile device;

storing, by the mobile device, the TOTP secret in a key store on the mobile device;

acquiring, by the mobile device, a request to generate a TOTP from a principal;

processing, by the mobile device, a first factor authentication of the principal attempting to access a protected resource and responsive to the processing obtaining a globally-unique identifier (GUID) for the principal;

generating, by the mobile device, the TOTP by hashing the TOTP secret, the GUID, and current Time-Of-Day (TOD); and providing, by the mobile device, the TOTP as a second factor authentication for authenticating and accessing the protected resource.

2. The method of claim 1 further comprising, presenting, by the mobile device, the TOTP on a display of the mobile device for access by the principal and accessing the protected resource.

3. The method of claim 1, wherein providing further includes obtaining the invitation token through an input supplied by the principal on the mobile device.

4. The method of claim 1, wherein providing further includes obtaining the invitation token through processing of an automated application that interacts with the mobile device.

5. The method of claim 1, wherein providing further includes periodically receiving a new invitation token to replace the invitation token.

6. The method of claim 1, wherein providing further includes supplying the invitation token to the TOTP manager when processing for the method is initiated for execution on the mobile device.

7. The method of claim 1, wherein providing further includes obtaining the invitation token in an email delivered to the mobile device.

8. The method of claim 1, wherein providing further includes including in the invitation token social identity data for the principal.

9. The method of claim 1, wherein obtaining further includes periodically obtaining a new TOTP secret from the TOTP manager replacing the TOTP secret.

10. The method of claim 1, wherein generating further includes adding a random number to a hash value when generating the TOTP based on instructions embedded in the TOTP secret and processed.

* * * * *